United States Patent [19]
Dorius

[11] 4,231,884
[45] Nov. 4, 1980

[54] WATER RETARDANT INSULATION COMPOSITION COMPRISING TREATED LOW DENSITY GRANULAR MINERAL MATERIAL AND FINELY DIVIDED LIMESTONE OR SIMILAR CARBONATE OR SILICATE MINERAL PARTICLES AND METHOD FOR USING SAME

[75] Inventor: Carl B. Dorius, Salt Lake City, Utah

[73] Assignee: American Gilsonite Company, Salt Lake City, Utah

[21] Appl. No.: 3,791

[22] Filed: Jan. 16, 1979

Related U.S. Application Data

[63] Continuation-in-part of Ser. No. 815,581, Jul. 14, 1977, abandoned.

[51] Int. Cl.$^3$ .................... C04B 43/08; C04B 43/00; F16L 59/02; F16L 59/04
[52] U.S. Cl. .................................. 252/62; 106/14.33; 106/14.39; 106/14.44; 252/383
[58] Field of Search ..................... 252/62, 383, 385; 108/14, 122; 405/157; 138/105

[56] References Cited

U.S. PATENT DOCUMENTS

| | | | |
|---|---|---|---|
| 436,225 | 9/1890 | Firtah | 252/62 |
| 2,003,335 | 6/1935 | Black | 252/62 X |
| 2,007,969 | 7/1935 | Grodsky | 405/157 |
| 2,625,512 | 1/1953 | Powell | 252/62 |
| 2,774,383 | 12/1956 | Kidd | 405/157 X |
| 2,824,022 | 2/1958 | Sucetti | 427/213 |
| 3,468,687 | 9/1969 | Thomas | 252/62 X |
| 3,655,564 | 4/1972 | Barrington | 252/62 |
| 3,950,259 | 4/1976 | Pallo et al. | 252/62 |

FOREIGN PATENT DOCUMENTS 727501 2/1966 Canada .
997795 7/1965 United Kingdom .

*Primary Examiner*—Harris A. Pitlick
*Attorney, Agent, or Firm*—Lyon & Lyon

[57] ABSTRACT

A water retardant composition comprising a mixture of a low density granular mineral material coated with a water repellant material, and a finally divided limestone or other carbonate or silicate mineral particles also coated with a water repellant material. The low density granular mineral material is preferably selected from the group consisting of expanded perlite, expanded vermiculite, expanded shale and pumice rock. The carbonate or silicate mineral particles are preferably selected from the group consisting of talc, clay, sericite, unexpanded perlite, magnesium silicate and aluminum silicate. Preferably, the low density granular mineral material is coated with a silicone or asphalt, while the limestone or other carbonate or silicate mineral material is preferably coated with a silicone or a salt of stearic acid. The composition exhibits excellent load bearing properties and resistance to water penetration through the matrix and provides improved thermal insulation and corrosion protection when packed around underground structures.

62 Claims, No Drawings

WATER RETARDANT INSULATION COMPOSITION COMPRISING TREATED LOW DENSITY GRANULAR MINERAL MATERIAL AND FINELY DIVIDED LIMESTONE OR SIMILAR CARBONATE OR SILICATE MINERAL PARTICLES AND METHOD FOR USING SAME

CROSS-REFERENCE TO RELATED APPLICATION

This is a continuation-in-part of my copending U.S. Application Ser. No. 815,581 which was filed on July 14, 1977, now abandoned, entitled "Composition & Method For Protecting Underground Structures", now abandoned.

BACKGROUND OF THE INVENTION

The present invention relates to a composition and method for insulating and protecting structures and, in particular, relates to a composition and method for thermally insulating underground structures and protecting them from corrosion.

In the past, pipes and other structures, particularly underground structures, have been thermally insulated and protected from corrosion by surrounding the structures with various materials such as water repellent granules, various wraps, conduits and the like. Since subterranean structures are frequently subjected to moisture conditions in excess of several feet of hydrostatic head, the problem commonly encountered in the art is to adequately protect these structures from corrosion as a result of moisture intrusion and to provide adequate thermal insulation against heat losses under such conditions.

One prior method of providing thermal insulation and corrosion protection to underground structures was to surround the structure with finely pulverized limestone particles having a water repellent organic coating. Although this material exhibited suitable water repellent properties, due in part to the finely divided nature of the material, it was difficult to handle and to properly compact around the underground structure as a result of its finely divided nature. When the underground structure is being buried, improper compaction of the material around the structure enables foreign objects such as dirt and rocks to penetrate the insulating envelope of material surrounding the structure, thereby destroying the water repellant integrity of the envelope. The presence of the foreign objects in the envelope permits the penetration of moisture into the envelope, resulting in a substantial loss in thermal insulating efficiency as well as the corrosion of the structure.

Expanded perlite and vermiculite have also been used to thermally insulate and protect underground structures. Perlite is a naturally occurring inorganic volcanic rock containing about 2% to about 6% combined water. When the crude rock is crushed and heated to a temperature above about 871° C., the combined water vaporizes and expands the perlite rock to a volume of about 4 to about 20 times greater than its original volume. This expansion process creates a great number of hollow cells in the material which makes the material lightweight and porous and provides it with a low coefficient of thermal conductivity. Vermiculite is another organic material which can also be expanded in a similar manner to a volume from about 6 to about 20 times greater than its original volume to form a similar type of porous, lightweight material having a low coefficient of thermal conductivity. However, when these granular materials are packed around underground structures, they readily absorb soil moisture due to their porous nature. The absorption of soil moisture also results in the loss of thermal insulating efficiency and the corrosion of the underground structure. In some cases, the expanded perlite and the expanded vermiculite materials are coated with water repellant compounds. However, the coated perlite and vermiculite were still ineffective in substantially preventing moisture penetration into the insulating envelope formed around the underground structure.

Thus, a composition which will provide greater resistance to moisture penetration to thereby thermally insulate and protect underground structures from corrosion is still sought.

It is therefore an object of the present invention to provide an improved water retardant composition.

It is a further object of the present invention to provide an improved composition and method for protecting structures from corrosion.

It is another object of the present invention to provide an improved composition and method to thermally insulate structures.

SUMMARY OF THE INVENTION

These and other objects and advantages are obtained by forming a water retardant composition consisting of discrete granular particles. Water repellency of the composition is dependent on such factors as the physical size of the interstices (air spaces) between the particles and the hydrophobicity of individual particles contained in the composition. The particle size distribution is important in that a proper selection of particle sizes for the composition will result in physically smaller interstices between the particles of the composition. The type of water repellant coating used is also of great importance since different coatings exhibit varying degrees of hydrophobicity.

The composition comprises a mixture of about 20% to about 80% by volume of a low density granular mineral material which has a bulk density from about 3 to about 65 pounds per cubic foot and is coated with a water repellant material, and about 80% to about 20% by volume of a limestone or other carbonate or silicate mineral particles which are also coated with a water repellant material and have a particle size smaller than about 150 mesh Tyler standard sieve size. The low density granular mineral material is preferably selected from the group consisting of expanded perlite, expanded vermiculite, expanded shale, and pumice rock. The other carbonate or silicate mineral particles are preferably selected from the group consisting of talc, clay, sericite, unexpanded perlite, magnesium silicate and aluminum silicate. Preferably, the low density granular mineral material is coated with a silicone or an asphalt, while the carbonate or silicate mineral particles are coated with a silicone or a salt of stearic acid.

The composition is designed to remain free-flowing in use, and exhibits excellent resistance to water penetration through the matrix formed by the discrete granular particles. The composition also has a suitable bulk density and coefficient of thermal conductivity, and when packed around structures the composition provides suitable load bearing properties. Moreover, surrounding an underground structure with a layer of the composition results in improved thermal insulation and corrosion protection for the structure.

A more thorough disclosure of the objects and advantages of the present invention is presented in the detailed description which follows.

DETAILED DESCRIPTION OF THE PREFERRED EMBODIMENT

The present invention contemplates a composition and method for insulating and protecting structures. The composition consists of discrete granular particles and comprises a mixture of a low density granular mineral material and a finely divided limestone or other carbonate or silicate mineral particles. Both the low density granular mineral material and the finely divided carbonate or silicate mineral particles are coated with a water repellant material. The composition exhibits substantially improved water retardant properties and provides improved thermal insulation and corrosion protection when it is packed around an underground structure.

The low density granular mineral materials are, in general, those minerals which contain from about 2% to about 6% combined water or occur naturally as an expanded lightweight material. When the rocks with the combined water are crushed and heated to above about 871° C., the combined water vaporizes, thereby expanding the semi-molten rock to a volume many times its original volume. As a result, each granule consists of many vesicular internal pores which are primarily closed cells, although the external surface exhibits a certain percentage of open or broken pores due to its jagged countenance. While the true specific gravity of this inorganic granular mineral material is more than twice the specific gravity of water, the weight of a cubic foot volume of the expanded granular mineral material may be as low as two pounds due to its expanded size and the inclusion of a high percentage of internal pores. Therefore, as a result of the internal porosity within the low density granular mineral material, the bulk density of a bed of this material is generally from about three pounds per cubic foot to a maximum of sixty-five pounds per cubic foot with about five to about fifteen pounds per cubic foot being the preferred range for the bulk density of the granular mineral material. This bulk density requirement necessitates that the granular mineral material contain from about 50% to about 95% internal pore volume.

The low density granular mineral material is preferably selected from the group comprising expanded perlite, expanded vermiculite, expanded shale, and pumice stone which occurs naturally as an "expanded" lightweight mineral material. Other suitable low density granular mineral materials known to one skilled in the art may also be utilized in the practice of the present invention. Furthermore, combinations of two or more low density granular materials may also be utilized in the practice of the present invention.

Preferably the low density granular mineral material has a particle size range such that all particles will pass through a ¼ inch mesh Tyler standard sieve size, with substantially all of the particles being retained on a 100 mesh Tyler sieve. A suitable size distribution for expanded perlite and expanded vermiculite particles which provides both excellent load bearing characteristics and water retardancy is as follows:

| Tyler Standard Sieve Size, Mesh | WEIGHT PERCENT ACCUMULATION | |
|---|---|---|
| | Expanded Perlite | Expanded Vermiculite |
| +¼" | 0 | 0 |
| +8 | 0–70 | 0–5 |
| +20 | 10–85 | 35–50 |
| +80 | 50–90 | 80–95 |
| −80 | 10–50 | 5–20 |

The finely divided limestone particles have a particle size substantially smaller than the particles comprising the low density granular mineral material. Substantially all of the limestone particles pass through a 150 mesh Tyler standard sieve. Preferably, substantially all of the particles pass through a 400 mesh Tyler standard sieve. However, it will be obvious to one skilled in the art that other particle sizes would also be suitable under the practice of the present invention. The pulverized limestone particles also preferably have a bulk density of about 55 to about 70 pounds per cubic foot.

Other carbonate as well as silicate mineral particles may be used in the practice of the present invention. Preferably, these other carbonate and silicate mineral particles are selected from the group consisting of talc, clay, sericite, unexpanded perlite, magnesium silicate, aluminum silicate and magnesite. Other suitable carbonate or silicate mineral particles known to one skilled in the art may also be utilized in the practice of the present invention. Furthermore, combinations of two or more carbonate or silicate mineral particles may also be utilized in the practice of the present invention. These other carbonate and silicate mineral particles also have a particle size substantially smaller than the particles comprising the low density granular mineral material, with substantially all of the particles passing through a 150 Mesh Tyler standard sieve, and preferably substantially all of the particles pass through a 400 mesh Tyler standard sieve. However, it would also be obvious to one skilled in the art that other finely divided particle sizes would be suitable in the practice of the present invention.

The low density granular mineral material and the limestone or other carbonate or silicate mineral particles must be covered with a water repellant coating to prevent the granules and particles from absorbing water and to provide protection from water penetration through the matrix formed by the discrete granular particles of the composition when it surrounds a buried structure. The type of water repellant coating used is of importance since different coatings exhibit varying degrees of hydrophobicity (resistance to wetting). In addition, for purposes of the present invention, a suitable water repellant coating must also have such properties that a very small quantity accomplishes the water repellant coating of the individual granule or particle. Preferably, the coating forms a monomolecular film. Since the present invention comprises a composition of free flowing dry granular particles designed to remain mobile when surrounding a subterranean pipe, the water repellant coating as applied to the individual particles should not be sticky or cause an agglomeration of the individual particles of the composition which would adversely affect the performance of the system.

While many chemical compounds can be broadly classified as water repelling or water repellent materials, the present invention is concerned primarily with those types of chemical compounds that form a water repellant or hydrophobic coating on a solid substrate by nature of their chemical or molecular makeup. Preferably, the water repellant coating is one which is capable of forming its water repellant coating as a thin monolayer film when it is adsorbed by the solid particles, and is bonded to the substrate either chemically or by electrostatic attraction. The chemical compounds which are known to impart hydrophobicity to granular or particulate substrates generally contain polar and non-polar molecules. The polar or ionizable portion is normally described as capable of developing electrical charges, e.g. hydroxyl groups. The non-polar portion is usually hydrocarbon in nature but may also be a fluorocarbon or a silicone. It is known that the polar portion of the molecule bonds to the substrate by adsorption and the non-polar portion of the molecular chain is exposed or orientated outward as "tails" which are hydrophobic. It is this orientation of the non-polar portion of the molecular structure of the water repellant chemical compound which imparts the water repellancy or hydrophobicity to the particles or substrates so coated.

Asphalts, asphaltites, waxes such as paraffins, and the like are also used as water repellant materials. However, these materials differ functionally from the chemical compounds described above. Generally, these types of materials do not contain polar molecules which can be orientated to the solid substrate by chemical or electrostatic bonding. In particular, asphalts, waxes and asphaltites have an especially complex molecular structure. As a result, these materials impart hydrophobicity by physically surrounding each particle of the substrate. Totally waterproofing a matrix of discrete granular particles with an asphalt, asphaltite or a wax requires that each particle be completely encapsulated by the asphalt, asphaltite or wax and that a continuous membrane of such water repellant coating exists between adjacent particles. Therefore, to be effective, coatings of an asphalt or wax or the like generally require thick continuous films. However, such films are not generally stable in the presence of heat or physical abrasion. Thus, water repellant coatings of asphalts and waxes, while suitable for many applications, would not be acceptable in those applications having elevated temperatures.

The low density granular mineral material is coated with a water repellant material selected from the group consisting of silicones, asphalts, waxes and gilsonite. Silicones are preferred due to their heat stability at elevated temperatures and their degree of hydrophobicity even when used in small quantities. However, as disclosed in Barrington, U.S. Pat. No. 3,655,564 and Sucetti, U.S. Pat. No. 2,824,022, the disclosures of which are incorporated herein by reference, asphalts may also be utilized to coat the low density granular mineral material in the practice of the present invention.

The finely divided limestone or other carbonate or silicate mineral particles, are also coated with a water repellant material. Preferably, substantially all of the surface area of the mineral particles are provided with the water repellant coating, about 95% or greater of the surface area of the particles generally being optimum. Preferably, the water repellant material is selected from the group consisting of silicones, asphalts, waxes, gilsonite, stearic acid, and salts of stearic acid. In particular, silicones and calcium stearate are preferred coatings for the limestone particles because of their unusually good resistance to solvents and excellent water repelling properties. Silicones are also the preferred coatings for the talc and the silicate particles. Silicones have the additional advantage of being non-sensitive to elevated temperatures. However, it will be obvious to those skilled in the art that other suitable water repellant coatings may also be utilized to coat the mineral particles in the practice of the present invention.

The discrete granular particles of the composition of the present invention can be coated by any suitable means well known to those skilled in the art such as spray drying and solvent evaporation. For example, suitable coated limestone particles can be prepared by adding the uncoated limestone particles to an aluminum stearate-benzene solution containing a sufficient quantity of aluminum stearate to provide an organic coating of 2% by weight. The solution is then evaporated off, leaving the coated particles. Suitable coated limestone for the practice of the present invention is manufactured and sold by Pfizer Minerals and Thompson, Weinman & Company under the trade names Hi-Pflex and Kotamite, respectfully.

The composition of the present invention comprises from about 20% to about 80% by volume of the coated low density granular mineral material and about 20% to about 80% by volume of the coated limestone particles or other coated carbonate or silicate mineral particles. In its preferred embodiment, the composition comprises from about 60% to about 80% by volume of the coated low density granular mineral material and about 20% to about 40% by volume of the coated limestone particles. When other coated carbonate or silicate mineral particles are used the composition preferably comprises from about 50% to about 80% by volume of the coated low density granular mineral material and about 20% to about 50% by volume of the carbonate or silicate mineral particles.

The composition of the present invention has a bulk density of about 20 to about 50 Lb/ft 3 and has a suitable coefficient of thermal conductivity. The bulk density is of importance with respect to the thermal insulating properties of the composition since it is a measure of the degree of porosity or air spaces contained within the matrix formed by the discrete granular particles of the composition. A high percentage of air spaces is preferred since this results in a low thermal conductivity for the composition. The composition also does not undergo significant sintering or fusion at temperatures up to about 460° F., a temperature which is greater than the temperature of most systems to which it may be applied. Thus, the composition will remain as a bed of mobile, discrete particles acting as a semi-fluid medium which cannot be disrupted by movements of the structure which occur during heating or cooling cycles. Eliminating the massive cracking which may occur in the insulating bed insures that the water resistant properties of the composition will prevail in retarding penetration of water to the structure surrounded by the bed, thereby thermally insulating the structure and preventing its corrosion.

In order to insulate the structure, the composition is compacted around the structure to form an insulating envelope or bed therearound. The amount of composition which is compacted around the structure is determined in part by the amount of heat insulation required. The thickness of the composition can be varied to obtain the desired amount of thermal insulation, and may be as thick as is necessary to obtain the requisite thermal insulation. In practice, the minimum thickness is often determined by the thickness which enables adequate compaction, which generally is about 2.0 inches. The composition is preferably compacted around the structure by using a concrete vibrator. However, compaction can also be affected by using other suitable vibrating means.

The composition of the present invention can be used to protect underground tanks, ducts, conduits, building foundations, etc. Furthermore, road beds, rail beds, and bridges may be insulated to protect them from ground water intrusion and to reduce freezing and heaving conditions. In those applications having higher load bearing and lower water retardancy requirements, the percentage of the low density granular mineral material having larger particle sizes may be increased.

In some cases, the composition of the present invention may be mixed with other materials to modify assorted properties of the composition of the present invention. For example, various additives may be included to modify such properties as load bearing, insulating, etc.

Although the rationale for the substantially improved water retardancy of the composition of the present invention is not fully understood, it is believed that the variation in particle sizes in the composition enables the formation of an intimate admixture wherein the smaller limestone particles or other carbonate or silicate mineral particles are disposed in the interstices between the larger sized granular mineral material. The resultant mixture exhibits a substantial increase in resistance to water penetration. Further, it is believed that the water repellant coating on the discrete granular particles also facilitates moisture retardation due to the large differences in surface tension between the coating and water.

The composition of the present invention has been tested and it has been found that the composition exhibits substantially greater water retardancy than either of its constituents. The composition of the present invention also exhibits improved load bearing properties. The following tables of data are a summary of the results of these tests. It is to be understood that this data is given primarily by way of illustration and not of limitation.

Referring to Table I, the composition of the present invention was compared to limestone coated with a water repellant organic coating derived from stearic acid, and expanded vermiculite having a bituminous coating formed according to the teachings of the Sucetti U.S. Patent. The composition of the present invention which was tested comprised about 60% by volume expanded coated vermiculite and about 40% by volume coated limestone. The bulk density and the coefficient of thermal conductivity were measured for each sample by methods well known to those skilled in the art. The amount of water retardancy was determined by the following method, generally termed the "Accelerated Downflow Method".

The sample of insulating material was packed into a two inch stainless steel pipe 5 inches long having a 40 micron stainless sintered metal plate welded to one end. A resistance probe of stainless steel comprising a ½ inch diameter, ⅛ inch thick stainless steel disc mounted on a ⅛ inch diameter stainless steel rod was inserted through a non-conducting ferrule in the sintered plate so that the disc was ¾ inch above the plate. The insulating material was compacted to a level 1¼ inches above the probe. One fourth to ½ inch of gravel was then placed over the sample of material and the sample was tamped. A stopper having a ¼ inch pipe through it was then placed in the top of the pipe. Fifty milliletters of water was then added and air pressure was imposed on the water through the pipe in the top of the apparatus. Air pressure is converted to an equivalent hydrostatic water head by the formula: inches of water = 27.68 × air pressure, p.s.i. The resistance between the wall of the pipe and the probe was measured. The pressure on the cylinder was increased at the rate of 0.2 p.s.i. every two minutes (equivalent to 5.54 inches of water head increase) and the resistance was determined. Failure was taken at the point where the measured resistance was less than 10 megohms. The resuls are set forth in Table I below.

TABLE I

| Description | Expanded Coated Vermiculite | Coated* Limestone | Composition+ |
| --- | --- | --- | --- |
| Temp. Range of Application, °F. Max. | 2000 | 480 | 460 |
| Coefficient of Thermal Conductivity, Btu/hr X ft 2 × °F./ft | 0.045 | 0.065 | 0.046 |
| Bulk density Compacted in Trench, Lb/Cu. Ft. | 9.7 | 67.8 | 40.7 |
| Water Retardancy, Inches | 0 | 200 | 327 |

*Protexulate
+contains Kotamite

The results of these tests indicates that the composition of the present invention provides substantially greater water retardancy than either of the constituents alone. This increase in water retardancy enables the composition in situ to maintain its thermal insulating and corrosion protecting capabilities.

Referring to Table II, compositions were formulated in accordance with the teaching of the present invention. The expanded perlite was coated by spraying a dilute silicone emulsion onto perlite particles which were still hot from the expansion process, and a silicone film was formed on the expanded perlite upon evaporation of the water contained in the emulsion. To illustrate the importance of proper surface treatment of the low density granular mineral material, in compositions containing coated limestone, two compositions of identical proportions were made, one containing untreated perlite and the other containing perlite of the same origin but treated with silicone to form a water repellant covering, and their moisture absorption was measured. The test for moisture absorption is well known in the art as a realistic evaluation of the ability of the insulation to retain its thermal insulating properties and to remain electrically non-conductive under adverse moisture conditions. Experience in the use of thermal insulation for underground pipes has shown that most insulation materials containing as litle as 5% moisture have a severely reduced capability to prevent heat loss, and allow the passage of electrical current, thereby permitting galvanic and/or electrolytic corrosion of the metallic structure surrounded by the insulating material.

Additionally, since research has shown that the ability of an insulating material to resist penetration of water after extended exposure to a standing head of water is a more realistic evaluation of its water repellant characteristics, these compositions were subjected to The Long Term Water Retardancy Test. Although the accelerated short term downflow retardancy test is a good method for quickly evaluating the ability of the insulation to resist moisture penetration, that test is not of sufficient duration to properly evaluate resistance to moisture penetration under conditions which may exist in actual field use applications. The long term water retardancy test which is well known to those skilled in the art, is more comparable to field conditions in that the bed of insulation is exposed to moisture for an extended period of time at a constant hydrostatic head pressure. In the long term test a 30" hydrostatic head was rapidly imposed upon the samples, and the head was not again altered. Upon completion of the test, regardless of whether or not electrical failure was measured, samples of the insulation were tested for moisture content to realistically evaluate the ability of the insulation to retain its thermal insulating properties, and to remain electrically nonconductive under adverse moisture conditions. The results of the tests are set forth in Table II below.

the low density granular mineral material is significant with respect to satisfactory performance of the composition for the thermal insulation and corrosion protection of subterranean pipes.

Referring to Table III, the load bearing properties of the composition of the present invention were compared to the load bearing properties of coated limestone and three lightweight granular materials used in the composition of the present invention. The composition of the present invention comprised about 60% by volume −8 mesh surface treated expanded perlite and about 40% by volume coated limestone for composition (a) and about 60% by volume −¼ inch surface treated expanded perlite and about 40% by volume coated limestone for composition (b). In all of the tests, the materials were placed in a container and compacted to the indicated density by first vibrating the material and them tamping the material. The load bearing strengths of the material were then tested by placing weights on the surface of the material and measuring the percent deflection. Table III is a summary of the results of this test.

TABLE II

| Composition Components And Proportations, Volume Percent | Composition No. | | | | | |
|---|---|---|---|---|---|---|
| | 1 | 2 | 3 | 4 | 5 | 6 |
| Expanded Perlite, Surface Treated[1] | 67 | 78 | 97 | 95 | | 78 |
| Expanded Perlite, Non Treated | | | | | 78 | |
| Coated Limestone, Fine Powder[2] | 33 | 22 | 3 | 5 | 22 | 22 |
| Evaluation Test: Waer Retardancy By Downflow Method, Hydrostatic Head of H₂O E Failure Inches | Exceeded 100 | Exceeded 100 | 33 | 38 | | |
| Moisture Absorption After Short Term Test, Wt. % | 0.55 | 0.85 | 15.5 | 4.8 | | |
| Moisture Absorption after Long Term Exposure to A Minimum of 30" Hydrostatic Head of Water, Wt. % | | | | | 29.8[3] | 0.66[4] |

[1]Expanded Perlite Commercially Treated With Silicone, Redco Grade 27S or Equal.
[2]Finely Ground Limestone Commercially Treated with Calcium Stearate, Pfizer Hi-Pflex 100 or Equal.
[3]Results After 5 Hour Exposure to a 30 Inch Head of Water.
[4]Results After 112 Days Exposure to a 60 Inch Head of Water.

An examination of the data set forth in Table II demonstrates the effect of proper surface treatment of the perlite component on the moisture absorption of the composition. After short term exposure to a hydrostatic head of water, Compositions 1 and 2 absorbed only 0.55 and 0.85 weight percent moisture respectively, clearly within the acceptable limits of moisture absorption with respect to loss of thermal and electrical resistance properties. Composition 4 would be of marginal utility, while composition 3 having greater than 95% by volume expanded Perlite would not be considered suitable. Moreover, the long term water retardancy test used to compare compositions 5 and 6 in Table II exposes the bed of insulation to moisture for an extended period of time. Composition 5 containing untreated perlite showed early loss of electrical resistance when exposed to a 30" hydrostatic head and failed (less than 10 meg-ohms electrical resistance) after only 5 hours of exposure to the 30" head of water. However, composition 6 showed no electrical failure at a 30" head. The hydrostatic head was subsequently raised to 60", but after 112 days exposure to a 60" head of water the composition had a moisture content of only 0.66 weight percent, clearly within the acceptable limit of 5%. Therefore, Table II demonstrates that proper surface treatment of

TABLE III

| | Load Bearing Strength (Percent Deflection of Insulation Layer vs. Surface Loading, Lb/sq. inch) | | | |
|---|---|---|---|---|
| MATERIAL | 25 | 50 | 75 | 100 |
| Coated Limestone* (55 Lb/cu.ft.) | 31.0% | 33.4% | 34.0% | 34.9% |
| Coated Limestone* (70 Lb/cu.ft.) | 9.0% | 11.9% | 13.0% | 13.5% |
| Coated Limestone+ (72 Lb/cu.ft.) | 15.5% | 19.3% | 20.5% | 21.3% |
| Vermiculite All-¼" | 26.5% | 38.0% | 47.2% | 54.0% |
| Coarse Perlite All-¼" | 10.8% | 20.9% | 30.2% | 38.1% |
| Perlite All-⅛" | 13.7% | 19.6% | 24.2% | 28.8% |
| Composition | | | | |
| (a) 42 Lb/cu.ft. | 3.5% | 7.0% | 10.0% | 13.0% |
| (b) 48 Lb/cu.ft. | 1.5% | 2.5% | 3.5% | 4.0% |

*Protexulate
+Kotamite

From the above, it can be seen that the composition of the present invention exhibits improved load bearing properties over coated limestone and the low density granular material and it will be obvious to one skilled in the art that the load bearing properties of the present invention will be suitable in most applications.

While embodiments and applications of this invention have been shown and described, it will be apparent to those skilled in the art that many more modifications are possible without departing from the inventive concepts herein described. The invention, therefore, is not to be restricted except as is necessary by the prior art and by the spirit of the appended claims.

I claim:

1. A composition for thermally insulating and protecting structures against corrosion comprising a mixture of about 80% to about 20% by volume limestone particles having a particle size smaller than about 150 mesh Tyler standard sieve size, said particles being coated with a water repellant material; and about 20% to about 80% by volume of a low density granular mineral material having a particle size larger than the limestone particles, each granule threof having vesicular pores such that said granular mineral material has a bulk density from about 3 to about 65 pounds per cubic foot, said granular mineral material being coated with a water repellant material selected from the group consisting of silicones, asphalts, waxes and gilsonite.

2. The composition of claim 1 wherein said low density granular mineral material is selected from the group consisting of expanded perlite, expanded vermiculite, expanded shale and pumice rock.

3. the composition of claim 1 wherein said low density granular mineral material has particle sizes such that said particles are substantially retained on a 100 mesh Tyler sieve.

4. The composition of claim 1 wherein said water repellant material coating said limestone particles is selected from the group consisting of silicones, asphalts, waxes, gilsonite, stearic acid, and salts of stearic acid.

5. The composition of claim 4 wherein said water repellant material coating said limestone particles is calcium stearate.

6. The composition of claim 1 wherein said low density granular mineral material comprises from about 60% to about 80% by volume of the composition and said limestone particles comprise from about 20% to about 40% by volume of the composition.

7. The composition of claim 1 wherein said composition has a bulk density from about 20 to about 50 pounds per cubic foot.

8. The composition of claim 1 wherein said composition has a moisture absorption of less than about 5 weight percent after The Long Term Water Retardancy Test equivalent to a 48 inch hydrostatic head.

9. The composition of claim 1 wherein said composition sustains at least a 60 inch hydrostatic head after The Accelerated Downflow Method Test.

10. The method of thermally insulating and protecting a structure from corrosion comprising covering at least a portion of said structure with a layer of insulating composition comprising a mixture of about 80% to about 20% by volume limestone particles having a particle size smaller than about 150 mesh Tyler standard sieve size, said particles being coated with a water repellant material; and about 20% to about 80% by volume of a low density granular mineral material having a particle size larger than the limestone particles, each granule thereof having vesicular pores such that said granular mineral material has a bulk density from about 3 to about 65 pounds per cubic foot, said granular mineral material being coated with a water repellant material selected from the group consisting of silicones, asphalts, waxes and gilsonite.

11. The method of claim 10 wherein said low density granular mineral material is selected from the group consisting of expanded perlite, expanded vermiculite, expanded shale and pumice rock.

12. The method of claim 10 wherein said low density granular mineral material has particle sizes such that said particles are substantially retained on a 100 mesh Tyler sieve.

13. The method of claim 10 wherein said water repellant material coating said limestone particles is selected from the group consisting of silicones, asphalts, waxes, gilsonite, stearic acid, and salts of stearic acid.

14. The method of claim 13 wherein said water repellant material coating said limestone particles is calcium stearate.

15. The method of claim 10 wherein said low density granular mineral material comprises from about 60% to about 80% by volume of the composition and said limestone particles comprise from about 20% to about 40% by volume of the composition.

16. A composition for thermally insulating and protecting structures against corrosion comprising a mixture of about 80% to about 20% by volume limestone particles having a particle size smaller than about 150 mesh Tyler standard sieve size, said particles being coated with a salt of stearic acid; and about 20% to about 80% by volume of a low density granular mineral material having a particle size larger than the limestone particles, the granular mineral material being selected from the group consisting of expanded perlite, expanded vermiculite, expanded shale, and pumice rock, said granular mineral material being coated with a silicone.

17. The composition of claim 16 wherein said limestone particles are coated with calcium stearate.

18. The method of thermally insulating and protecting a structure from corrosion comprising covering at least a portion of said structure with a layer of insulating composition comprising a mixture of about 80% to about 20% by volume limestone particles having a particle size smaller than about 150 mesh Tyler standard sieve size, said particles being coated with a salt of stearic acid; and about 20% to about 80% by volume of a low density granular mineral material having a particle size larger than the limestone particles, the granular mineral material being selected from the group consisting of expanded perlite, expanded vermiculite, expanded shale, and pumice rock, said granular mineral material being coated with a silicone.

19. The method of claim 18 wherein said limestone particles are coated with calcium stearate.

20. A composition for thermally insulating and protecting structures against corrosion comprising a mixture of about 80% to about 20% by volume limestone particles having a particle size smaller than about 150 mesh Tyler standard sieve size, said particles being coated with a silicone; and about 20% to about 80% by volume of a low density granular mineral material having particle sizes larger than the limestone particles, the granular mineral material being selected from the group consisting of expanded perlite, expanded vermiculite, expanded shale, and pumice rock, said granular mineral material being coated with a silicone.

21. The method of thermally insulating and protecting a structure from corrosion comprising covering at least a portion of said structure with a layer of insulating composition comprising a mixture of about 80% to about 20% by volume limestone particles having a particle size smaller than about 150 mesh Tyler standard sieve size, said particles being coated with a silicone; and about 20% to about 80% by volume of a low density granular mineral material having a particle size larger than the limestone particles, the granular mineral material being selected from the group consisting of expanded perlite, expanded vermiculite, expanded shale, and pumice rock, said granular mineral material being coated with a silicone.

22. The composition of claim 16 or 20 wherein said low density granular mineral material has particle sizes such that said particles are substantially retained on a 100 mesh Tyler sieve.

23. The composition of claim 16 or 20 wherein said low density granular mineral material comprises from about 60% to about 80% by volume of the composition and said limestone particles comprise from about 20% to about 40% by volume of the composition.

24. The composition of claim 16 or 20 wherein said composition has a bulk density from about 20 to about 50 pounds per cubic foot.

25. The method of claim 18 or 21 wherein said low density granular mineral material has particle sizes such that said particles are substantially retained on a 100 mesh Tyler sieve.

26. The method of claim 18 or 21 wherein said low density granular mineral material comprises from about 60% to about 80% by volume of the composition and said limestone particles comprise from about 20% to about 40% by volume of the composition.

27. The method of claim 18 or 21 wherein said composition has a bulk density from about 20 to about 50 pounds per cubic foot.

28. A composition for thermally insulating and protecting structures against corrosion comprising a mixture of about 80% to about 20% by volume mineral particles not having vesicular pores, said mineral particles being selected from the group consisting of silicate minerals and carbonate minerals, said particles having a particle size smaller than about 150 mesh Tyler standard sieve size, said particles being coated with a water repellant material; and about 20% to about 80% by volume of a low density granular mineral material having a particle size larger than the mineral particles, each granule thereof having vesicular pores such that said granular mineral material has a bulk density from about 3 to about 65 pounds per cubic foot, said granular mineral material being coated with a water repellant material selected from the group consisting of silicones, asphalts, waxes and gilsonite.

29. The composition of claim 28 wherein said low density granular mineral material is selected from the group consisting of expanded perlite, expanded vermiculite, expanded shale and pumice rock.

30. The composition of claim 28 wherein said low density granular mineral material has particle sizes such that said particles are substantially retained on a 100 mesh Tyler sieve.

31. The composition of claim 28 wherein said mineral particles are selected from the group consisting of talc, clay, sericite, unexpanded perlite, magnesium silicate, aluminum silicate and magnesite.

32. The composition of claim 28 wherein said water repellant material coating said mineral particles is selected from the group consisting of silicones, asphalts, waxes, gilsonite, stearic acid, and salts of stearic acid.

33. The composition of claim 28 wherein said low density granular mineral material comprises from about 50% to about 80% by volume of the composition and said mineral particles comprise from about 20% to about 50% by volume of the composition.

34. The composition of claim 28 wherein said composition has a bulk density from about 20 to about 50 pounds per cubic foot.

35. The composition of claim 28 wherein said composition has a moisture absorption of less than about 5 weight percent after The Long Term Water Retardancy Test equivalent to a 48 inch hydrostatic head.

36. The composition of claim 28 wherein said composition sustains at least a 60 inch hydrostatic head after The Accelerated Downflow Method Test.

37. The method of thermally insulating and protecting a structure from corrosion comprising covering at least a portion of said structure with a layer of insulating composition comprising a mixture of about 80% to about 20% by volume mineral particles not having vesicular pores, said mineral particles being selected from the group consisting of silicate minerals and carbonate minerals, said particles having a particle size smaller than about 150 mesh Tyler standard sieve size, said particles being coated with a water repellant material; and about 20% to about 80% by volume of a low density granular mineral material having a particle size larger than the mineral particles, each granule thereof having vesicular pores such that said granular mineral material has a bulk density from about 3 to about 65 pounds per cubic foot, said granular mineral material being coated with a water repellant material selected from the group consisting of silicones, asphalts, waxes and gilsonite.

38. The method of claim 37 wherein said low density granular mineral material is selected from the group consisting of expanded perlite, expanded vermiculite, expanded shale and pumice rock.

39. The method of claim 37 wherein said low density granular mineral material has particle sizes such that said particles are substantially retained on a 100 mesh Tyler sieve.

40. The method of claim 37 wherein said mineral particles are selected from the group consisting of talc, clay, sericite, unexpanded perlite, magnesium silicate, aluminum silicate and magnesite.

41. The method of claim 37 wherein said water repellant material coating said mineral particles is selected from the group consisting of silicones, asphalts, waxes, gilsonite, stearic acid, and salts of stearic acid.

42. The method of claim 37 wherein said low density granular mineral material comprises from about 50% to about 80% by volume of the composition and said mineral particles comprise from about 20% to about 50% by volume of the composition.

43. The method of claim 37 wherein said composition has a bulk density from about 20 to about 50 pounds per cubic foot.

44. A composition for thermally insulating and protecting structures against corrosion comprising a mixture of about 80% to about 20% by volume mineral particles not having vesicular pores, said mineral particles being selected from the group consisting of silicate minerals and carbonate minerals, said particles having a particle size smaller than about 150 mesh Tyler standard sieve size, said particles being coated with a silicone; and about 20% to about 80% by volume of a low density granular mineral material having particle sizes larger than the mineral particles, each granule thereof having vesicular pores such that said granular mineral material has a bulk density from about 3 to about 65 pounds per cubic foot, said granular mineral material being selected from the group consisting of expanded perlite, expanded vermiculite, expanded shale, and pumice rock, said granular mineral material being coated with a silicone.

45. The composition of claim 44 wherein said mineral particles are selected from the group consisting of talc, clay, unexpanded perlite, magnesium silicate, aluminum silicate and sericite.

46. The composition of claim 44 wherein said low density granular mineral material has particle sizes such that said particles are substantially retained on a 100 mesh Tyler sieve.

47. The composition of claim 44 wherein said low density granular mineral material comprises from about 50% to about 80% by volume of the composition and said mineral particles comprise from about 20% to about 50% by volume of the composition.

48. The composition of claim 44 wherein said composition has a bulk density from about 20 to about 50 pounds per cubic foot.

49. The method of thermally insulating and protecting a structure from corrosion comprising covering at least a portion of said structure with a layer of insulating composition comprising a mixture of about 80% to about 20% by volume mineral particles not having vesicular pores, said mineral particles being selected from the group consisting of silicate minerals and carbonate minerals, said particles having a particle size smaller than about 150 mesh Tyler standard sieve size, said particles being coated with a silicone; and about 20% to about 80% by volume of a low density granular mineral material having particle sizes larger than the mineral particles, each granule thereof having vesicular pores such that said granular mineral material has a bulk density from about 3 to about 65 pounds per cubic foot, said granular mineral material being selected from the group consisting of expanded perlite, expanded vermiculite, expanded shale, and pumice rock, said granular mineral material being coated with a silicone.

50. The method of claim 49 wherein said mineral particles are selected from the group consisting of talc, clay, unexpanded perlite, magnesium silicate, aluminum silicate and sericite.

51. The method of claim 49 wherein said low density granular mineral material has particle sizes such that said particles are substantially retained on a 100 mesh Tyler sieve.

52. The method of claim 49 wherein said low density granular mineral material comprises from about 50% to about 80% by volume of the composition and said mineral particles comprise from about 20% to about 50% by volume of the composition.

53. The method of claim 49 wherein said composition has a bulk density from about 20 to about 50 pounds per cubic foot.

54. A composition for thermally insulating and protecting structures against corrosion comprising a mixture of about 80% to about 20% by volume limestone particles having a particle size smaller than about 150 mesh Tyler standard sieve size, said particles being coated with calcium stearate; and about 20% to about 80% by volume of expanded perlite having a particle size larger than the limestone particles, the expanded perlite being coated with a silicone.

55. A composition for thermally insulating and protecting structures against corrosion comprising a mixture of about 80% to about 20% by volume limestone particles having a particle size smaller than about 150 mesh Tyler standard sieve size, said particles being coated with a silicone; and about 20% to about 80% by volume of expanded perlite having a particle size larger than the limestone particle, the expanded perlite being coated with a silicone.

56. A composition for thermally insulating and protecting structures against corrosion comprising a mixture of about 80% to about 20% by volume talc particles having a particle size smaller than about 150 mesh Tyler standard sieve size, said particles being coated with a silicone; and about 20% to about 80% by volume of expanded perlite having a particle size larger than the limestone particles, the expanded perlite being coated with a silicone.

57. The composition of claims 54, 55 or 56 wherein said low density granular mineral material has particle sizes such that the particles are substantially retained on a 100 mesh Tyler sieve.

58. The composition of claims 1, 16, 20, 54 or 55 wherein substantially all of the limestone particles pass through a 400 mesh Tyler sieve.

59. The compositions of claims 28 or 44 wherein substantially all of the mineral particles pass through a 400 mesh Tyler sieve.

60. The composition of claim 56 wherein substantially all of the talc particles pass through a 400 mesh Tyler sieve.

61. The methods of claims 10, 18 or 21 wherein substantially all of the limestone particles pass through a 400 mesh Tyler sieve.

62. The method of claims 37 or 49 wherein substantially all of the mineral particles pass through a 400 mesh Tyler sieve.

* * * * *